No. 835,204. PATENTED NOV. 6, 1906.
F. STREICH.
DOUGH MOLDING MACHINE.
APPLICATION FILED JULY 7, 1905.

Witnesses:
Chas. F. Bassett
M. A. Milord

Inventor,
Frank Streich
By Frederick Benjamin
Atty.

UNITED STATES PATENT OFFICE.

FRANK STREICH, OF CHICAGO, ILLINOIS, ASSIGNOR, BY MESNE ASSIGNMENTS, TO CHAMPION MACHINERY COMPANY, OF JOLIET, ILLINOIS, A CORPORATION OF ILLINOIS.

DOUGH-MOLDING MACHINE.

No. 835,204.

Specification of Letters Patent.

Patented Nov. 6, 1906.

Application filed July 7, 1905. Serial No. 268,750.

*To all whom it may concern:*

Be it known that I, FRANK STREICH, a citizen of the United States, residing at Chicago, in the county of Cook and State of Illinois, have invented certain new and useful Improvements in Dough-Molding Machines, of which the following is a specification.

This invention relates to improvements in machines for molding lumps of dough of irregular shapes into spherical form and at the same time stretching the skin of such lumps and drawing same to a point at the bottom of the completed loaf form.

The especial object of the improvements embodied in this application is to produce a machine of this character of extremely simple form which can be cheaply manufactured and will produce a large number of loaves rapidly and economically.

This machine is especially adapted to the manufacture of biscuit.

Figure 1:
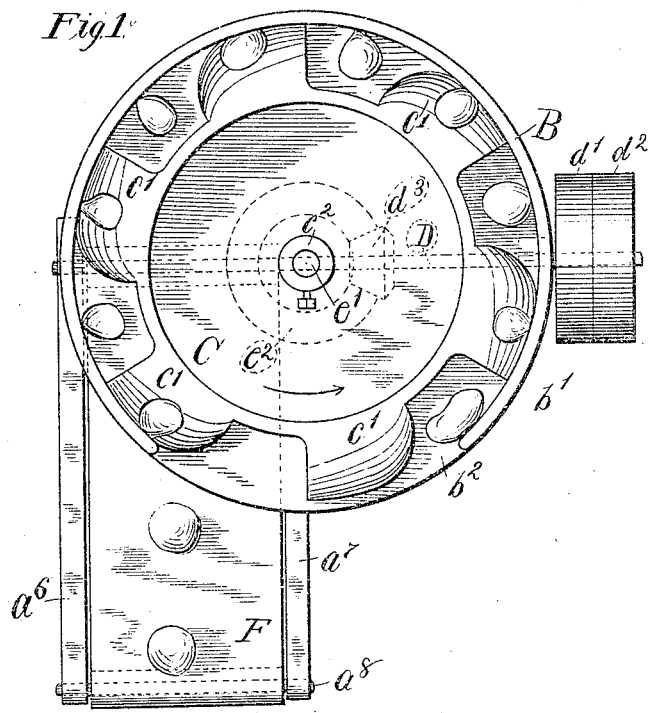
Figure 2:
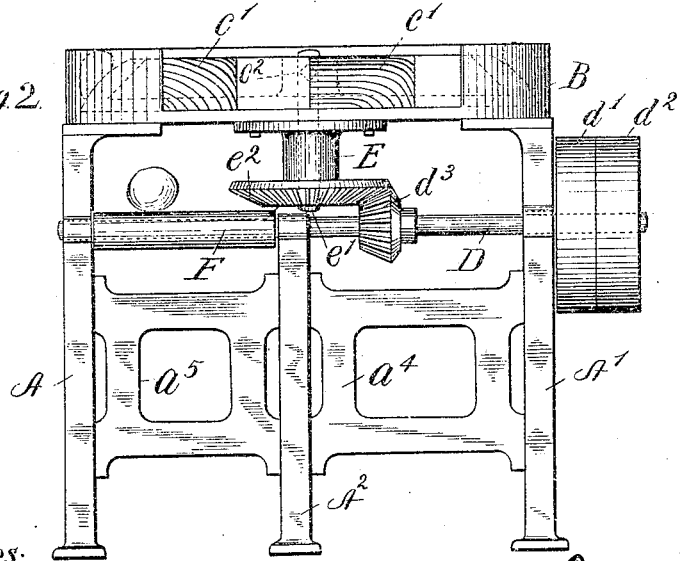

Referring to the drawings, which form a part of this application, Figure 1 is a top plan view of my improved machine, and Fig. 2 is a front elevation of same.

Referring to the details of said drawings, A, A', and A² represent uprights which are joined by the horizontal braces $a^4$ $a^5$, and which together constitute the supporting-frame of my machine. Secured to the top of the frame members is a circular table B, having a vertical rim $b'$, which extends around the periphery of the table except at a point $b^2$, where the rim is broken away for the introduction and passage of the lumps of dough. Resting on top of the table B is an annular molding member C, which is composed of a series of connected spaced projections $c'$, which are formed with a convex face and which taper toward their front edge. This molding element is mounted on a vertical shaft $c'$, which extends through a suitable central hub or boss $c^2$ on the member C, and said shaft is provided with a vertical bearing in the table B, which is bolted to and pendent from the under side of the central portion of the table B. On the lower end of the shaft $c'$ is secured a beveled gear $e^2$, the teeth of which mesh with the teeth of a beveled pinion $d^3$, mounted on the horizontal shaft D. This shaft is provided with suitable bearings in the frame members A, A', and A² and has secured to its outer end tight and loose pulleys $d'$ and $d^2$. The frame members A A² are formed with forwardly-projecting horizontal extensions $a^6$ $a^7$, in the outer ends of which is journaled a shaft $a^8$, on which is fixed a roller, (indicated in dotted lines in Fig. 1,) and a similar roller is also carried by the shaft D between its bearings in the frame-uprights A A². Stretched upon and traveling over the rollers on the shafts D and $a^8$ is an endless belt F, which is adapted to receive the lumps of dough when discharged by gravity from the table B through the cut-away portion $b^2$ of the rim $b'$.

In operation the lumps of dough of irregular form thrown upon the table B when the molding element C is rotating in the direction indicated by the arrow in Fig. 1 will be forced against the vertical inner wall of the rim $b'$ and by reason of the peculiar convex and tapering conformation of the portions $c'$ of said molding element will be drawn forwardly and downwardly between the face of said projections and the sides of said wall. At the same time these pressing or molding and stretching actions are performed the lumps of dough will be rotated around a vertical axis and will be carried by frictional contact between said projections and the wall around the periphery of the table B until they reach the termination of the rim $b'$, where they will drop by gravity upon the endless belt F, from which they will be removed by the operator and placed in the baking-pans. The several operations of molding, stretching, and rotating between the wall of the rim $b'$ and the convex and inclined faces of the projections $c'$ produce a loaf of dough of smooth exterior and of the form of a top, the skin being drawn to a single point. When these loaves are placed in a pan, they assume an approximately spherical form, which is desirable in bakery products of certain kinds.

Having thus described my invention, what I claim as new, and desire to secure by Letters Patent, is—

1. In a dough-molding machine, a table, a dough-molding element rotatably mounted on said table, said element having a plurality of spaced peripheral projections having convex operating-faces substantially as described, and means for operating said rotatable element.

2. In a dough-molding machine, a table, a dough-molding element rotatably mounted on said table, said element provided with a plurality of spaced projections having inclined operating-faces and with pockets between said projections and said table having an annular rim with a vertical face adapted to coöperate with said projections for the purpose and in the manner described, and means for operating said rotatable element.

3. In a dough-molding machine, a table, a dough-molding element rotatably mounted on said table, said element having on its periphery a plurality of spaced projections formed with convex and tapering operating-faces substantially as described, and said table having an annular rim with a vertical face arranged to coöperate with the convex faces of said projections for the purpose described.

4. In a dough-molding machine, a table having an annular rim with an opening therein at one point, molding means consisting of a plurality of rotatably-mounted projections having flat bases resting on said table and having convex and tapering faces adapted, in conjunction with said rim, to press lumps of dough and rotate same, substantially as described.

5. In a dough-molding machine, a fixed table having an annular rim, a rotatable element mounted on said table, and provided with a plurality of annular projections and with pockets or openings between said projections, each of said projections formed with a face inclining upwardly and rearwardly, and outwardly toward said rim, substantially as set forth.

In testimony whereof I affix my signature in presence of two witnesses.

FRANK STREICH.

Witnesses:
H. De Los Higman,
F. Benjamin.